March 7, 1939.    J. E. STRIETELMEIER    2,149,639
BUN FILLING DEVICE
Filed Oct. 14, 1937    3 Sheets-Sheet 1
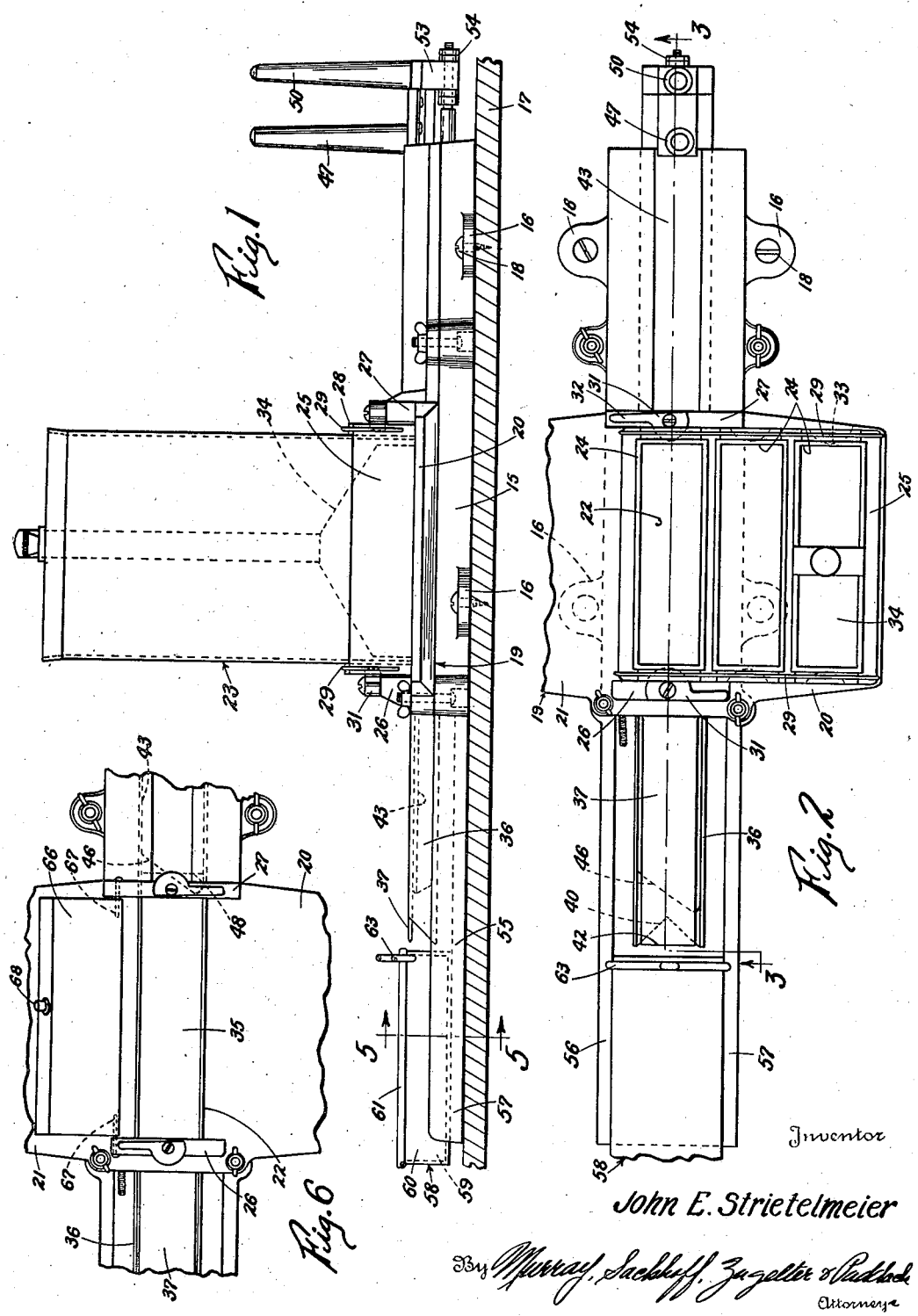
Inventor
John E. Strietelmeier
By Murray, Sackhoff, Zugelter & Paddock
Attorneys

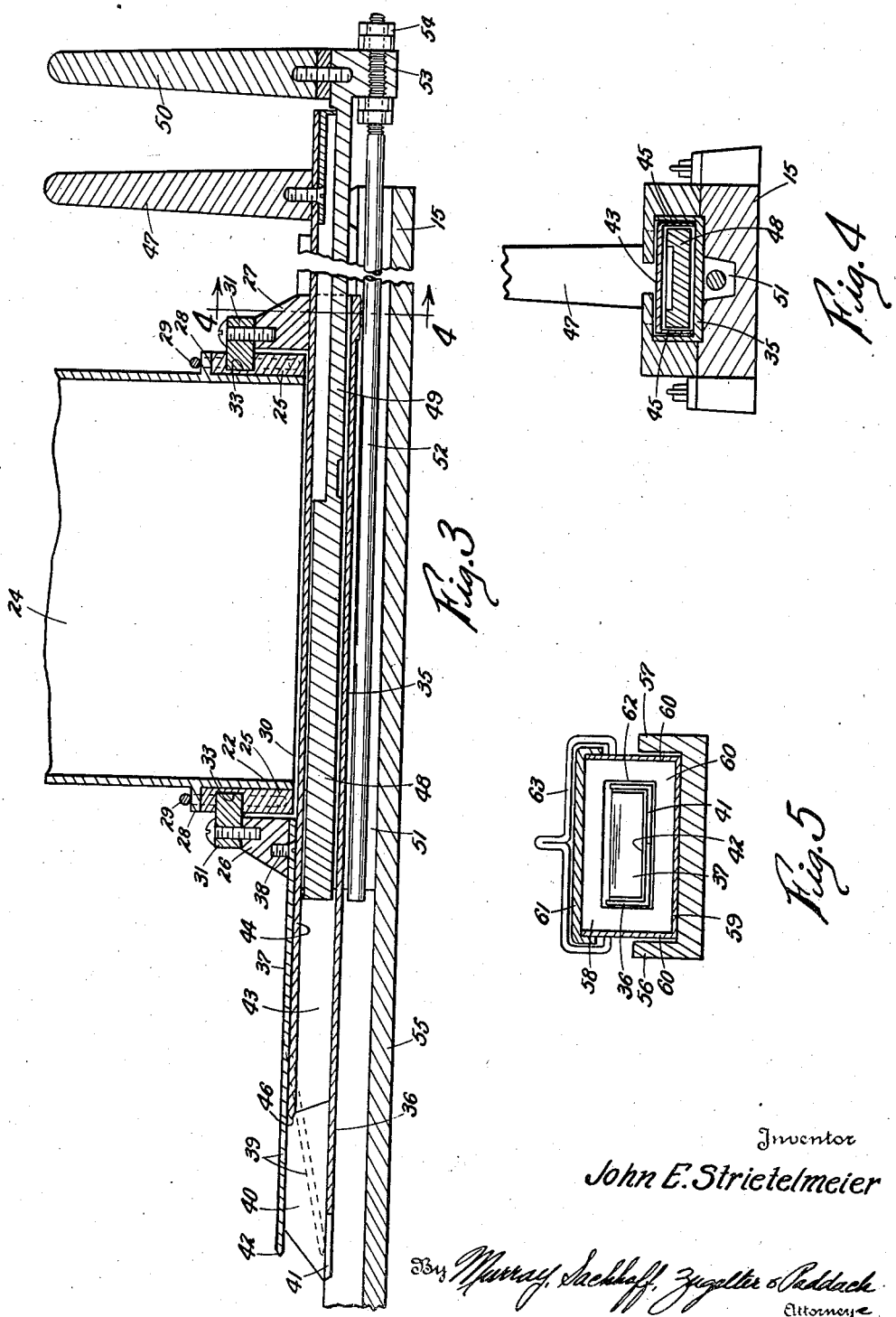

March 7, 1939.   J. E. STRIETELMEIER   2,149,639
BUN FILLING DEVICE
Filed Oct. 14, 1937   3 Sheets-Sheet 3
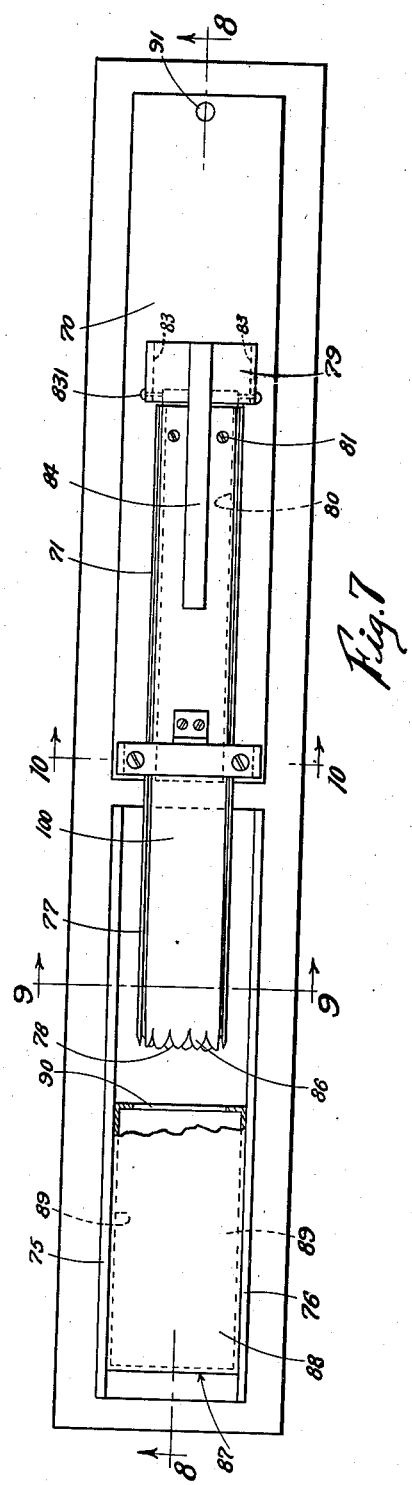
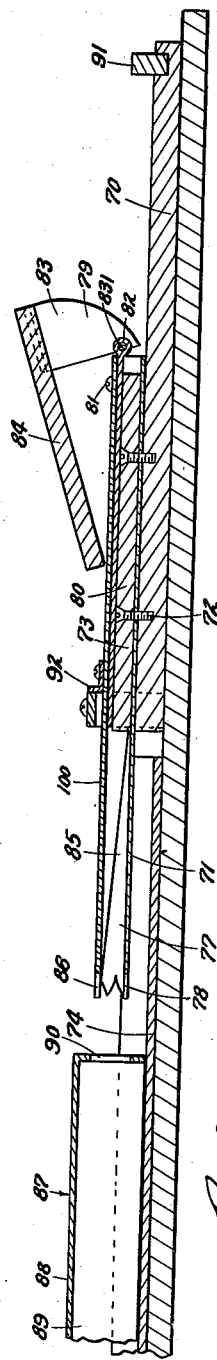
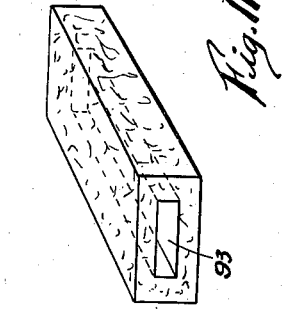
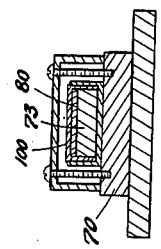
INVENTOR.
John E. Strietelmeier
BY
Murray, Sachloff, Zugelter & Paddack
ATTORNEYS Patented Mar. 7, 1939

2,149,639

UNITED STATES PATENT OFFICE 2,149,639

BUN FILLING DEVICE

John E. Strietelmeier, Cincinnati, Ohio, assignor to Bar-B-Buns, Inc., Cincinnati, Ohio, a corporation of Ohio Application October 14, 1937, Serial No. 168,977

9 Claims. (Cl. 107—1)

This invention generally relates to a means for preparing and dispensing of baked, raised dough products and particularly to a mechanical device for providing an elongated inset in this class of baked goods for the reception of a suitable sandwich filler material.

An object of the invention is to provide a means for forming an inset in a prebaked, raised dough product of the conventional bun or cake variety.

Another object of the invention is to provide a quick, simple and economical machine for forming an inset in a bun for the reception of a filler material.

A further object of the invention is to provide an efficient mechanical unit for making an inset in a finished bun product which thereafter feeds a filler material into the said inset.

A still further object of the invention is to provide a sandwich which may contain a juicy or semi-fluid filler material and may be eaten by the consumer without inconvenience due to the leaking of said filler.

Other objects will be apparent from the following specification and drawings, in which:

Fig. 1 is a side elevational view of one form of my invention.

Fig. 2 is a top, plan view of the device shown in Fig. 1.

Fig. 3 is a cross-sectional view taken on line 3—3 of Fig. 2.

Fig. 4 is a cross-sectional view taken on line 4—4 of Fig. 3.

Fig. 5 is a cross-sectional view taken on line 5—5 of Fig. 1.

Fig. 6 is a top, plan view of the device of Fig. 1 showing the reservoir unit removed.

Fig. 7 is a top plan view of a modified form of my device.

Fig. 8 is a cross-sectional view taken on line 8—8 of Fig. 7.

Fig. 9 is a cross-sectional view taken on line 9—9 of Fig. 7.

Fig. 10 is a cross-sectional view taken on line 10—10 of Fig. 7.

Fig. 11 is a perspective view of a bun containing a recess formed by the device of Fig. 7.

The embodiment of one form of my invention consists of an elongated base 15 having a number of positioning lugs 16 to fasten it to a suitable supporting structure 17 by means of screws 18. Positioned upon the forward portion of the base is a reservoir table 19 having extended portions 20 and 21. As illustrated in Fig. 6, the table has a centrally disposed opening 22 formed wholly therethrough. The reservoir unit 23 is slidably positioned upon the table portion and to this end a plurality of rectangular reservoirs 24 held together adjacent their base portions by strap 25 is positioned between two spaced upstanding wall portions 26 and 27 which are suitably made integral with the table portion. The reservoirs are removably held within the strap by providing flanges 28 upon their opposite side walls which are engaged by a transversely extending wire clamp 29 rotatably mounted on the strap portion. As illustrated in Fig. 3, the flanges also serve to determine the position of the reservoir openings 30 above the opening 22 in the table. A cam clamp 31 having a handle 32 is rotatably mounted upon the upstanding walls 26 and 27 which engage circular insets 33 formed in the transverse side walls of the strap 25. The clamps and the associated insets serve to selectively position the desired reservoir above the centrally disposed opening 22 in the table. The reservoirs are adapted to contain sandwich filling material which is compressed downwardly within the reservoirs by means of a weighted object 34.

Positioned upon the base and beneath the reservoir opening 30 is an elongated and substantially U-shaped spout 35 (Fig. 3) provided with a portion 36 which extends longitudinally from the base. A yieldable plate 37 fastened beneath the forward edge of the base by means of screws 38 and having substantially the same width as the distance between the side walls of the spout is disposed within the extended portion of said spout. The greater portion of the plate is in parallelism with the bottom of the spout, the free end 39 thereof normally converging toward said bottom as illustrated in the dotted lines of Fig. 3. The free end 40 of the spout is provided with a V-shaped knife edge 41 whilst the free end of the plate 39 is provided with a transverse knife edge 42. It will be seen that the bottom of the spout and free end of the plate form a wedge-shaped portion which is devised to pierce the central portion of a bun as is hereinafter set forth.

An inverted and substantially U-shaped knife 43 is movably positioned within the spout, the top portion 44 thereof being held in spaced parallelism with the bottom of the spout by means of side portions 45. The forward edge of the knife is provided with a cutting edge 46, a handle 47 being provided at its rear edge for manually moving the knife within the spout. As illustrated in Fig. 3, the top of the knife is in substantial engagement with the opened bottom edge 39 of the receptacle. The forward portion of the knife, when in operative position, serves to bring the plate 39 from normal inclined position to a position of spaced parallelism with the extended bottom portion of the spout. Disposed between the knife and the bottom of the spout is a movable plunger 48 having an extension 49 extending rearwardly therefrom, the latter being provided with a handle 50 for manually operating said plunger. As shown in Fig. 3 and Fig. 4, the base has a narrow groove 51 located beneath the spout which carries a rod 52 which is fastened to a downward extension 53 on the plunger by means of bolts 54. The plunger and the rod are therefore devised to be moved by the handle 50.

A guideway 55 having two vertical sides 56 and 57 is disposed subjacent the spout and adjacent the base and extends longitudinally and centrally of the direction of said spout. A bun receptacle 58 having a bottom 59, four vertical side walls 60 and a hinged top 61 is adapted to be moved in the guideway 55. The receptacle is provided with an aperture 62 (Fig. 5) formed centrally in the transverse side wall adjacent the spout and is also provided with a rotatable wire clamp 63 for holding the top 61 in a closed position when the receptacle contains a bun and is in operative condition.

To operate the device, a bun or other raised dough product, substantially the same shape as the inside dimensions of the receptacle 58, is placed therein and the lid securely closed by means of the clamp 63. The receptacle is then placed upon the guideway 55 and moved adjacent the base 15 thereby allowing the extended portion 36 of the spout to enter the central portion of the bun through the aperture 62 formed in the transverse side wall of the receptacle. In this receptacle position, the spout extends substantially through the longitudinal center of the bun.

The yieldable plate 37 located in the spout normally occupies the position indicated by dotted lines in Fig. 3 thus forming a wedge which spreads apart the two opposite sides of the bun center which have been previously separated by action of the spout knife edge 40 and the plate cutting edge 42. As illustrated in Fig. 6, the cutting edge of the movable knife 43 and the forward end of the plunger 48 are retracted by means of their respective handles to a position adjacent the rearward portion of the opening 22 in the reservoir table to allow filler material in the reservoir to drop into the portion of the spout subjacent the opening. It is contemplated that various types of sandwich filler material may be held in the reservoir unit, it being only necessary to select the reservoir containing the desired filler and position it above the opening in the table and securely fasten the unit by means of the cam clamp 31.

The cutting knife is now moved by means of handle 47 from a position indicated in Fig. 6 to the position shown in Fig. 3. This action severs the lowermost portion of the filling material located in the spout and also raises the yieldable plate 37 from the dotted line position to a position of spaced parallelism with the bottom of the spout thereby forming an inset or cavity centrally of the bun which has the same dimensions as the cross-sectional dimensions of the spout. The plunger is then moved by means of handle 50 from the position indicated in Fig. 6 to the position illustrated in Fig. 3 thus moving the severed filler material along the spout to a spout enclosed position within the bun center. The rod 52 contacts the bottom portion of the receptacle and upon further movement of handle 50 moves the receptacle away from the base thereby locating the filler material in the preformed cavity in the bun. The bun is removed from the receptacle and is ready for consumption.

It is contemplated that my device can be used without employing the reservoir unit. To this end an elongated and thickened cover 66 is pivotally fastened between the upstanding walls 26 and 27 of the reservoir table by means of pins 67 (Fig. 6). An individual charge of filler material is then placed in the U-shaped spout 35, the cover rotated by means of handle 68 so that its bottom portion will contact the top surfaces of the table adjacent the opening 22. The cam clamps are then rotated to securely fasten the cover over the opening 22. A bun receptacle is then slid around the spout 36 and the plunger and movable knife moved from a retracted position to an operative position bringing the individual charge of filler material into the bun as hereinbefore set forth.

Another form of my invention, as illustrated in Figs. 7 to 11 inclusive, comprises a base 70 having an elongated U-shaped spout 71 positioned thereon by means of bolts 72 fastened through a stop block 73, the spout and the upper portion of said base. A guideway 74 having side walls 75 and 76 is located adjacent the base and subjacent the extended portion 77 of the spout. The free end of the extended portion of the spout is provided with a knife edge 78. An inverted U-shaped knife 100 is mounted for longitudinal movement within the spout and is provided at its rearward end with a rotatable cam block 79. The cam block is suitably fastened to the knife by means of an elongated plate 80 fastened to the top portion thereof by means of bolts 81, the rear portion of said plate having an aperture 82 therein to receive a pin 83¹ which engages the two vertical sides 83 of the cam block. The upper portion of the cam block is provided with a handle 84. The forward side walls 85 of the knife converge upwardly to a cutting edge 86.

In this form of the device I prefer to employ a bun receptacle 87 having a top 88 and side walls 89, one side wall thereof being provided with a centrally disposed aperture 90 for receiving the extended portion of the spout 77. In operation the cutting knife is retracted to a position determined by the engagement of the rearward end of said knife with a lug 91 positioned in the base. A bun is then placed in the receptacle, the latter being moved to a position adjacent the base thereby bringing the spout through the aperture 90 and into the center of the bun. The handle 84 of the cam block is then grasped to move the cutting knife to the position indicated in Fig. 8 which is limited by the lug 92 carried by said cutting knife. It will be seen that the longitudinal center of the bun has now been severed by the spout knife edge 78 and the cutting knife 86 by means of handle 84. The cam block is now rotated by means of handle 84 to raise the rear edge of the knife upwardly which acts to lower the forward edge of the knife toward the bottom of the spout thereby clamping the bun center firmly between the spout and the knife. The bun receptacle is then moved away from the spout leaving its core within said spout. A bun having a central inset 93 (Fig. 11) is then removed from the receptacle and is in condition to receive a suitable filler material therein.

What is claimed is:

1. In a device of the character described the combination of a base, an elongated U-shaped spout fastened to the base and extending longitudinally therefrom, a movable bun receptacle having a spout receiving aperture formed in a wall thereof, and means associated with the spout for providing a central cavity in the bun when the receptacle has been moved to a position adjacent the base.

2. In a device of the character described the combination of a base, an elongated and substantially U-shaped spout fastened upon the base and extending longitudinally therefrom, a knife edge formed in the free end of the spout, a guideway disposed beneath the spout, a closed bun receptacle movable in the guideway and having a spout receiving aperture formed centrally in a side wall thereof, and means associated with the spout for providing a central cavity in the bun when the receptacle has been moved in the guideway to a position adjacent the base.

3. In a device of the character described the combination of a base, an elongated and substantially U-shaped spout fastened upon the base and extending longitudinally therefrom, a knife edge formed in the free end of the spout, a guideway disposed adjacent the base and subjacent the spout, a closed bun receptacle movable in the guideway and having a spout receiving aperture formed centrally in a side wall thereof, and means contained in the spout and associated therewith for providing a central cavity in the bun when the receptable has been moved in the guideway to a position adjacent the base.

4. In a device of the character described the combination of a base, a substantially U-shaped spout fastened upon the base and extending longitudinally therefrom, a knife edge formed in the free end of the spout, a guideway disposed adjacent the base and subjacent the spout, a rectangular bun receptacle movable in the guideway and having a spout receiving aperture formed centrally in a transverse side wall thereof, means for moving the receptacle in the guideway to a position adjacent the base whereby to locate the extended portion of the spout within the receptacle and means contained in the spout and associated therewith for providing a cavity in the bun.

5. A device for filling buns or the like comprising a base, a reservoir positioned on the base and adapted to contain filling material for the bun, a spout positioned on and extending from the base, adapted to communicate with the reservoir, a yieldable, elongated plate positioned on the base and disposed in the extended portion of the spout, the plate and bottom surface of the spout forming a wedge for piercing the bun, means for urging the spout into the longitudinal center of the bun, a cutting means for severing a piece of filling material held in the reservoir, and a plunger means for discharging the said severed filling material between the spout and the spring and then into the bun.

6. A device for filling buns or the like comprising a base, a spout positioned on the base and extending longitudinally therefrom, a reservoir positioned above and communicating with the spout adapted to contain filling material for the bun, and the spout having a cutting edge at its free extremity, a yieldable plate positioned on the base and extending into the extended portion of the spout, a guideway subjacent the spout and adjacent the base, a slidable knife having a handle at its extremity and movable within the spout, a plunger movable within the cutter and spout and having a handle at its extremity, a bun receptacle having a spout receiving aperture formed in a side wall thereof, the receptacle being adapted to move in the guideway whereby to urge the spout into the longitudinal center of the bun, the cutter being adapted to sever a piece of filling material from the material held in the reservoir and the plunger being adapted to discharge the said severed material into the spout and then into the center of the bun.

7. A device for filling buns or the like comprising a base, a reservoir positioned upon the base, a substantially U-shaped spout fastened to the base and positioned beneath the reservoir and communicating therewith, the spout having a cutting edge at its extremity, a yieldable plate positioned on the base and extending into the spout, the plate and the bottom of the spout forming a wedge for piercing the bun, a substantially inverted U-shaped cutter having a handle movable in the spout, a plunger movable and movable within the cutter and the spout and having a handle fastened thereto, a rod fastened to the plunger, a receptacle for receiving a bun and having an aperture formed in a side wall thereof, the receptacle being adapted to urge the spout into the longitudinal center of the bun, the cutter being adapted to sever a piece of filling material from the material held in the reservoir, the plunger being adapted to discharge the said severed material into the spout and then into the center of the bun, and the rod being employed to urge the box away from the spout after the bun is filled.

8. A device for filling buns or the like comprising a base, a substantially U-shaped spout fastened upon the base and extending therefrom, a reservoir unit positioned upon the base above the spout and having a plurality of compartments for filling material selectively communicating with the spout, the spout having a cutting edge at its extremity, a yieldable plate positioned on the base and extending into the extended portion of the spout the plate and the bottom of the spout normally forming a wedge for piercing the bun, a substantially inverted U-shaped knife having a handle at its extremity and movable in the spout, a plunger movable within the knife and the spout and having a handle at its extremity, a rod fastened to the plunger, a receptacle for receiving the bun and having an aperture in a side wall for receiving the spout, a guideway adjacent the base and subjacent the spout the receptacle being movable in the guideway and being adapted to urge the spout into the longitudinal center of the bun, the cutter being adapted to sever a piece of filling material from the material held in a reservoir, the plunger being adapted to discharge the severed material into the spout, the spring being raised by the pressure of the movable knife to force a recess in the bun to receive the filling material, and the rod being employed to urge the box away from the spout after the bun is filled.

9. In a device of the character described the combination of a base, an elongated and substantially U-shaped spout fastened upon the base and extending longitudinally therefrom, a knife edge formed in the free end of the spout, a guideway disposed adjacent the base and subjacent the spout, a cutting knife movable in the spout and spaced from the bottom thereof, a bun receptacle movable in the guideway and having a spout receiving aperture formed centrally in a side wall thereof, means for moving the receptacle in the guideway to a position adjacent the base, and means for tilting the knife to move the portion of said knife, located in the spout extention into substantial contact with the bottom of the spout.

JOHN E. STRIETELMEIER.